United States Patent [19]

Sprague

[11] Patent Number: 4,623,161
[45] Date of Patent: Nov. 18, 1986

[54] BOAT TRAILER

[75] Inventor: Wendell Sprague, Mercer Island, Wash.

[73] Assignee: Mobi-Dock, Inc., Mercer Island, Wash.

[21] Appl. No.: 692,834

[22] Filed: Jan. 18, 1985

[51] Int. Cl.⁴ .............................................. B60P 3/10
[52] U.S. Cl. ................................ 280/414.1; 414/563; 280/482; 114/344
[58] Field of Search ........................... 280/414.1, 482; 414/563, 483; 114/344

[56]  References Cited
U.S. PATENT DOCUMENTS

| | | | |
|---|---|---|---|
| 2,779,602 | 1/1957 | Kimbro et al. | 280/414.1 |
| 3,938,829 | 2/1976 | Anderson | 280/414.1 |
| 3,989,266 | 11/1976 | Foster | 280/414.1 |
| 3,993,324 | 11/1976 | Carrick | 280/414.1 |

Primary Examiner—John J. Love
Assistant Examiner—Donn McGiehan
Attorney, Agent, or Firm—Jensen & Puntigam

[57] ABSTRACT

A boat trailer including a main frame (4,8) having mounted thereon a keel support (21) adjustable, side supports (20) and self-storing upwardly and outwardly flaring dolphins (22). The trailer is capable of being located in water deep enough to float the boat on or off because the tongue is extendible, box beam (70) including hitch (76) is movable relative to box beam (10) under control of powered drive means (74), controlling flexible members (80,84), the opposite ends of which are anchored to box beam (10). A floating boat is guided into an automatic latch mechanism by guides (18,30) and automatically secured to or released from latch (48) from the helm of the boat.

8 Claims, 15 Drawing Figures

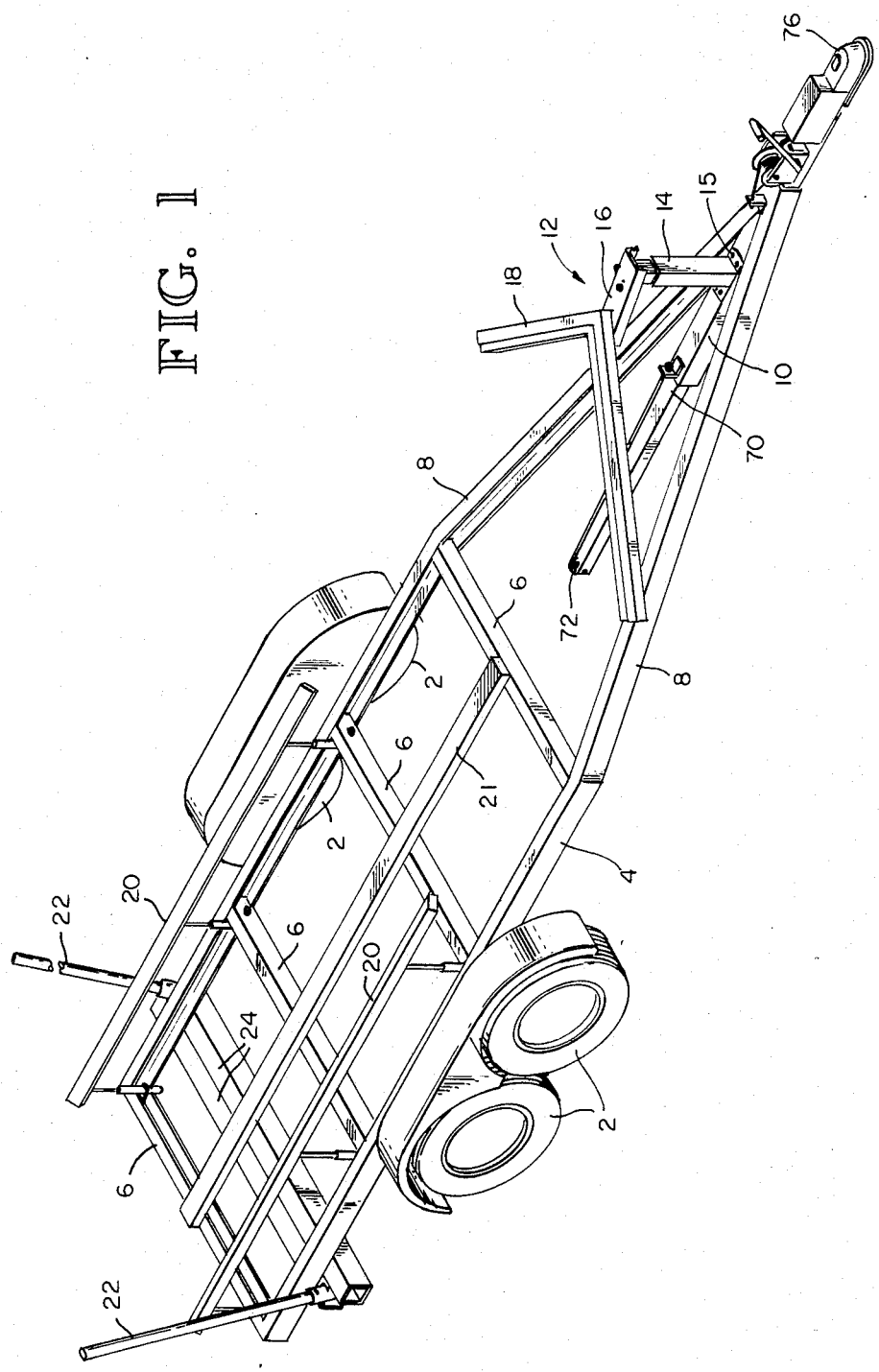

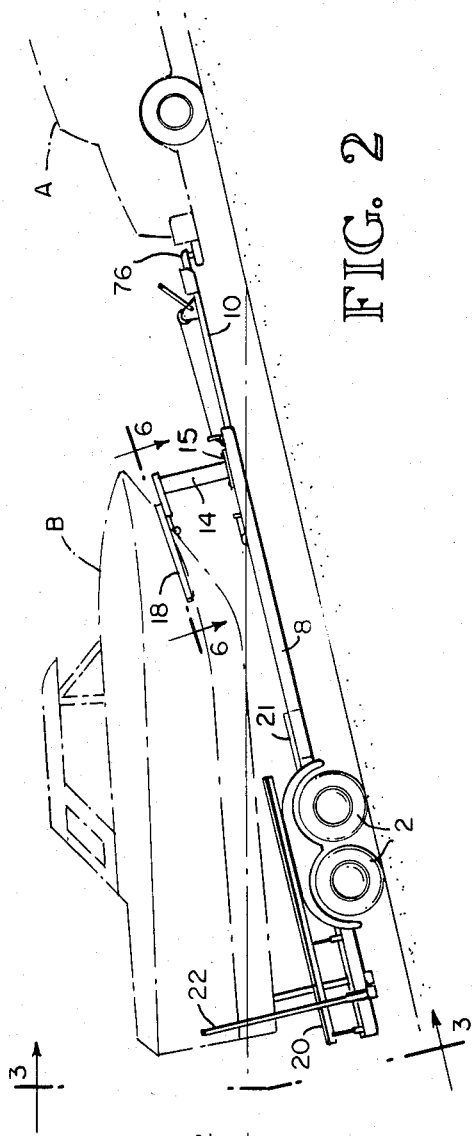
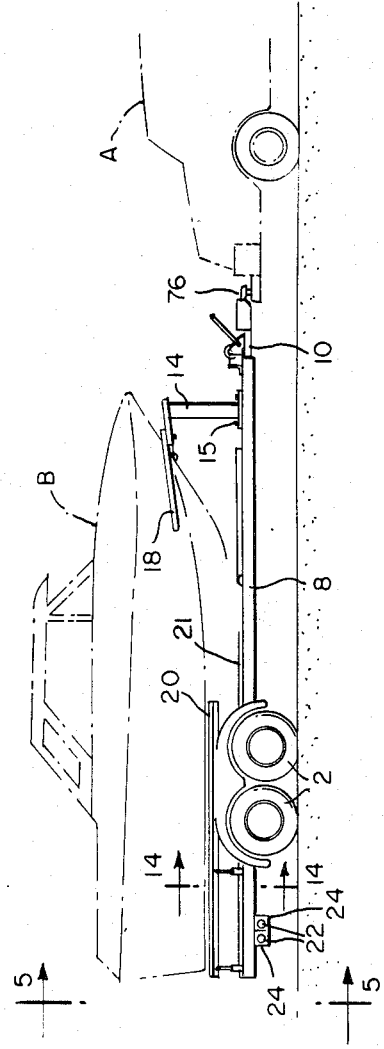
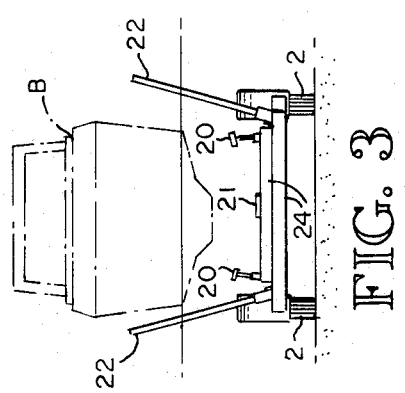
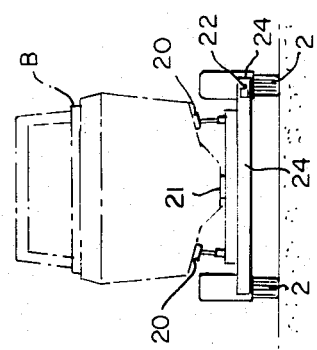

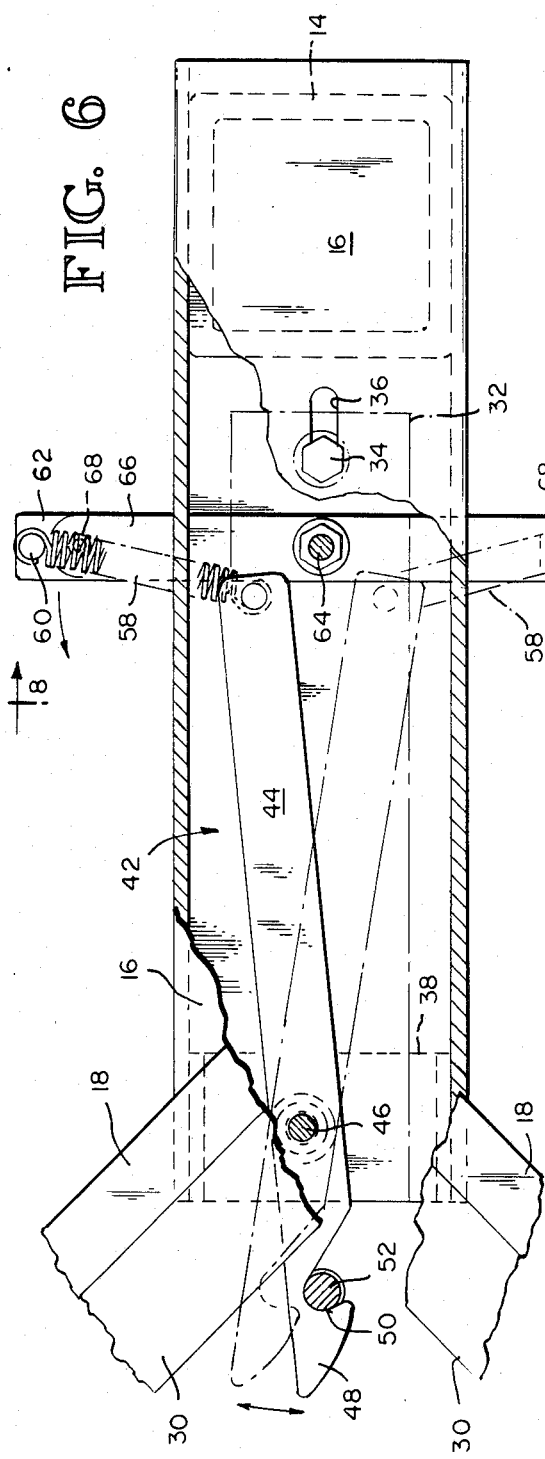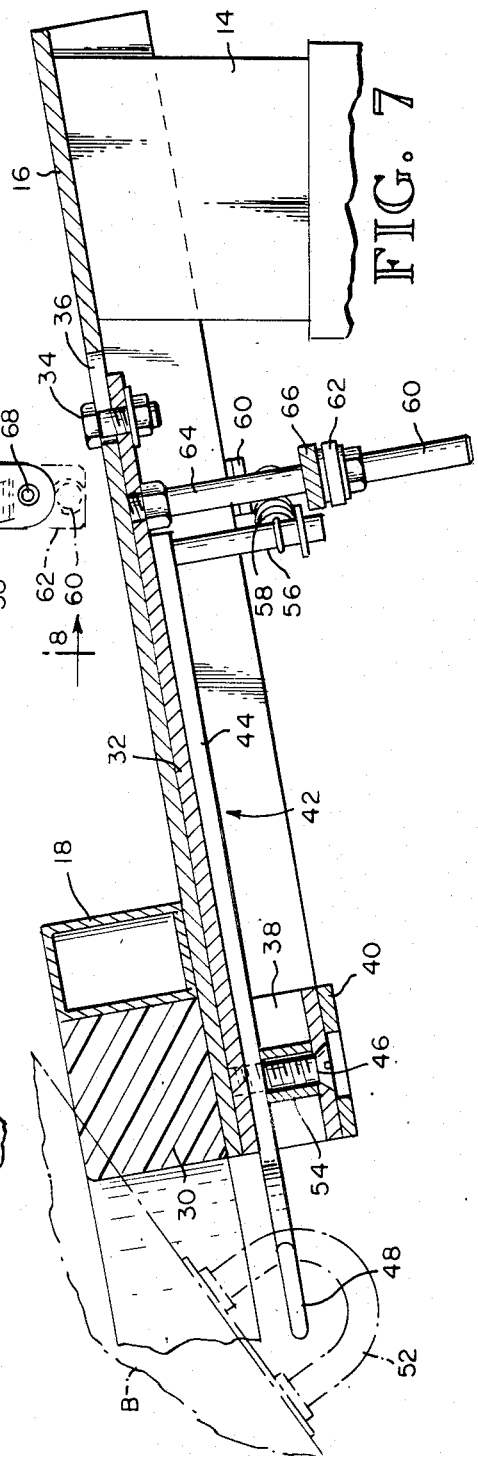

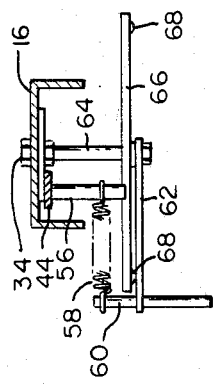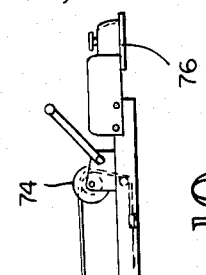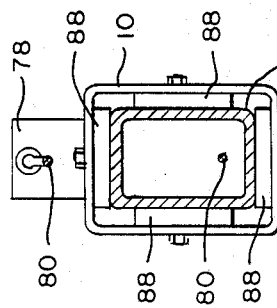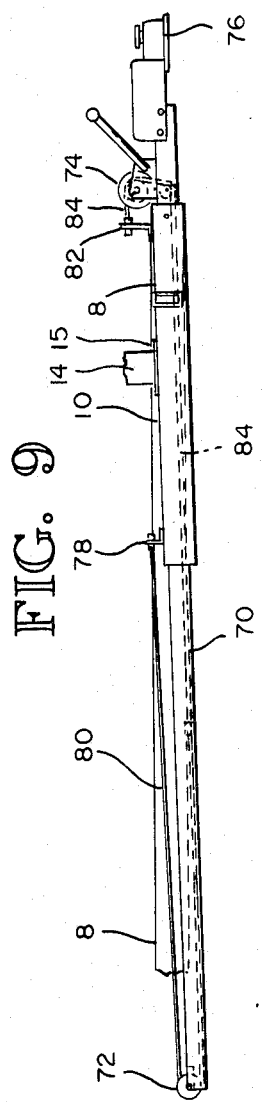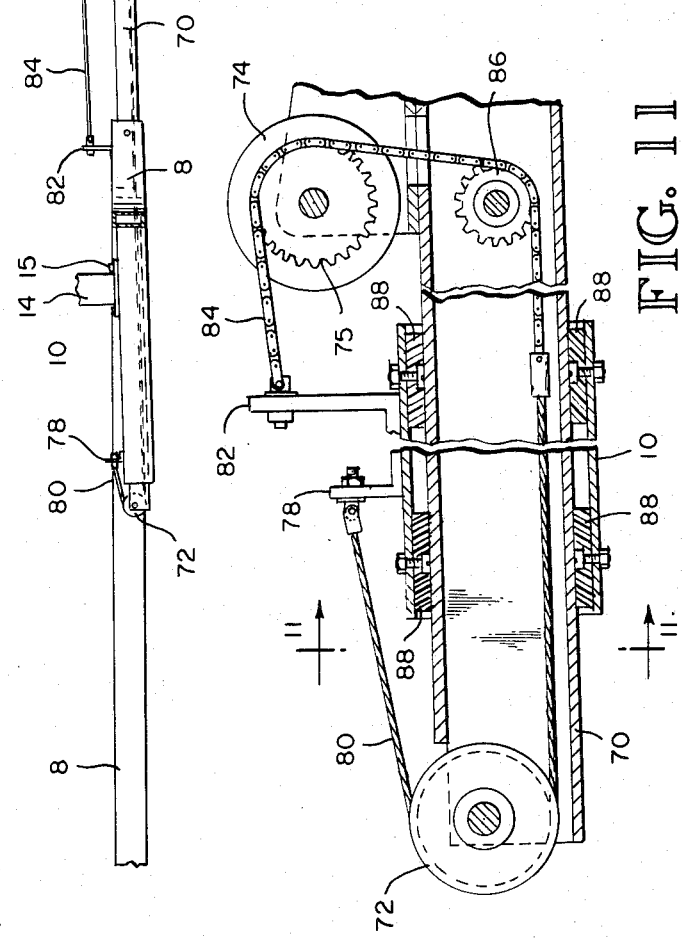

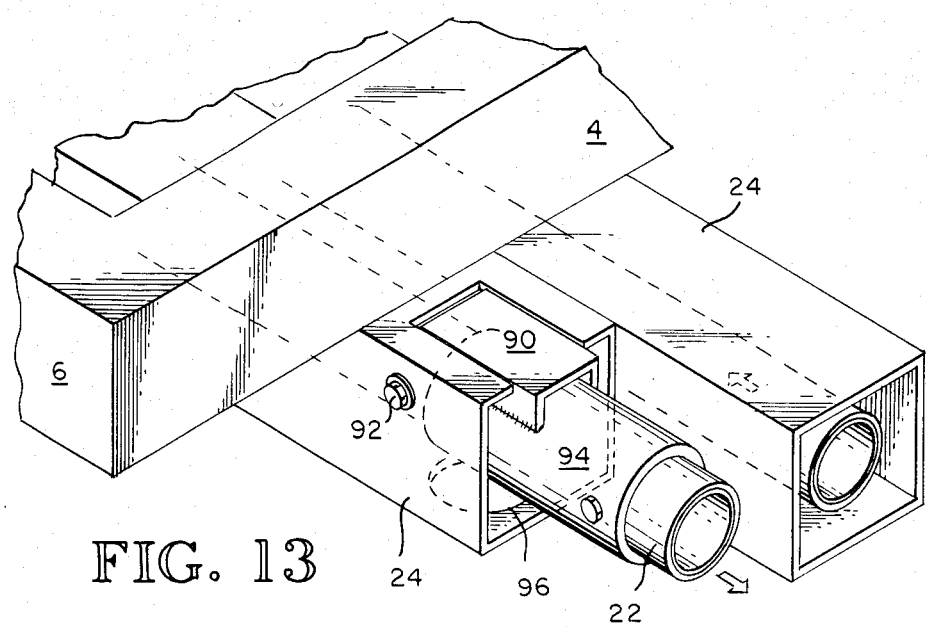
FIG. 13
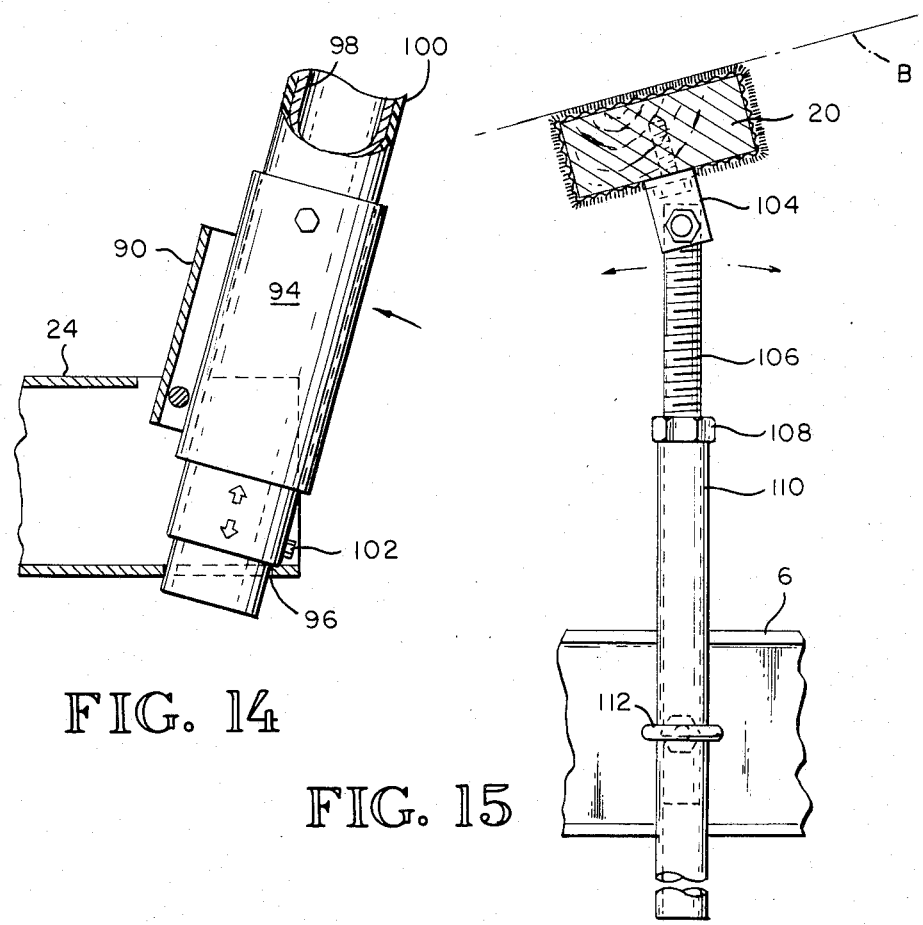
FIG. 14
FIG. 15

BOAT TRAILER

DESCRIPTION

1. Technical Field

This invention relates to boat trailers and more particularly to a boat trailer which includes a tongue which may be extended and retracted under positive control permitting the main trailer portion to reach deeper water during launch and recovery and yet be close enough to the pulling vehicle during transport, an automatic latch mechanism permits the operator of the boat to secure his boat to or release his boat from the trailer without leaving the cockpit of the boat. The trailer includes extended guide dolphins which facilitate recovery of the boat when the trailer is in deeper water and assure proper placement upon the trailer but which may be easily stored for transport and adjustable bunk supports to accommodate a variety of hulls.

2. Background Art

Conventional boat trailers permit a boat owner to have the convenience and pleasure of a boat at a variety of locations. The trailer permits the boat to be towed by a motorized vehicle from place to place and further permits the owner to store the boat in his garage or upon his property without incurring the expense of additional storage. The presently existing trailers, however, have a variety of limitations which detract from the above noted conveniences. Because of the requirements that the trailer be as compact as possible for ease in transporting and handling, the boat normally cannot be floated clear of the trailer thus requiring a plurality of rollers to accommodate movement of the boat as well as a winch to draw the boat totally onto the trailer or to control the release. Typically, the launch or recovery of a boat requires two persons, one to position secure and control the boat and the other to control the winch mechanism. The problems of launch and recovery are magnified under adverse wind or wave conditions. Further, the use of trailers which support the boat by rollers place localized stress upon the shell of the boat increasing the possibility of deformation damage to the hull.

Because of the need for the boat to be secured to the winch line for movement onto or off of the trailer, the operator must leave the cockpit of the boat to secure and/or release the cable fastening. This operation either leaves the boat out of control for a time period or necessitates another person on board.

In summary, the utilization of the currently available boat trailers, although greatly increasing the flexibility and pleasure offered to boat owners, generally requires a cooperative effort between two or more individuals to launch and/or recover the boat. The use of these trailers also requires a substantial amount of practice and/or skill to assure that the operation is done safely with little or no damage to the boat or the trailer.

Prior art known to the applicant dealing with latching mechanisms on boat trailers include U.S. Pat. No. 3,632,138 granted Jan. 4, 1972 to Whiteley, Jr. which discloses in FIGS. 3-5 a self-latching mechanism which is secured to the bow of the boat. The latch relies upon the spring tension exerted directly on element 133 to retain it in engagement with the latch on the boat of the boat.

U.S. Pat. No. 3,750,805 granted Aug. 7, 1973 to Finney discloses in FIGS. 3-6 a spring operated latch mechanism upon a trailer which operates in conjunction with a boat operated latch mechanism mounted to the bow of the boat and which could possibly allow automatic recovery but would not allow automatic release.

U.S. Pat. No. 3,938,829 granted Feb. 17, 1976 to Anderson discloses a boat/trailer latching device which requires a special bow eye upon the boat and further the latch is not capable of being released from the helm position.

U.S. Pat. No. 3,963,263 granted to Whitlock on June 15, 1976 discloses a self-latching mechanism including opposing jaws but does not disclose the mechanism or the concept to permit release from the helm.

U.S. Pat. No. 4,463,965 granted Aug. 7, 1984 to Lawson discloses a self-latching mechanism wherein the bow eye must, to prevent damage, approach the latching mechanism in a predetermined plane. The mechanism disclosed does not permit release from the helm position.

Prior art dealing with extending tongue trailers include U.S. Pat. No. 2,938,642 granted May 31, 1960 to Felix which discloses an extendible tongue including an exterior downwardly open channel allowing the two sections of the tongue to assume relative positions other than colinear and utilizes a single chain to drive both inwardly and outwardly.

U.S. Pat. No. 3,167,198 granted Jan. 26, 1965 to Echlar et al discloses a trailer wherein the extension is generated by extending the twin chassis beams.

U.S. Pat. No. 3,284,101 granted Nov. 8, 1966 to Arnold discloses a telescoping interconnector between two vehicles.

U.S. Pat. No. 3,738,684 granted June 12, 1983 to Lusk discloses a trailer having a tongue which may be folded upwardly adjacent the bow of the carried boat.

U.S. Pat. No. 3,989,266 granted Nov. 2, 1976 to Foster discloses a telescoping trailer tongue driven by a continuous chain which is completely enclosed within the interior tube.

U.S. Pat. No. 4,232,990 granted Nov. 11, 1980 to Pierce discloses a telescopic trailer tongue controlled by a winch driven, multi-wrap cable.

U.S. Pat. No. 4,331,346 granted May 25, 1982 to Walters discloses a winch driven telescopic trailer tongue.

Prior art dealing with dolphins or guides include U.S. Pat. No. 3,127,041 granted Mar. 31, 1964 to Flynn et al which discloses a pair of spring loaded angularly placed guides 106, 108 to assist in guiding the hull of boat during loading.

U.S. Pat. No. 3,447,815 granted June 3, 1969 to West discloses a pair of upright guides designed to contact the hull and sides of the boat in horizontal movement to assist in guiding it to a proper position above the trailer.

U.S. Pat. No. 4,268,212 granted May 19, 1981 to Weary discloses a pair of uprights 28, 30 which have value only is approached from a horizontal attitude.

Prior art related to bunk mountings include U.S. Pat. No. 3,131,902 granted May 5, 1964 to Zak, Jr. includes a horizontally adjustable storing device primarily for fixed installments.

U.S. Pat. No. 3,140,003 granted July 7, 1964 to Horner discloses a bunk-type mounting having no apparent adjustment capability.

U.S. Pat. No. 3,403,798 granted Oct. 1, 1968 to Flachbarth et al discloses a bunk mounting on a trailer limited to incremental vertical adjustment.

U.S. Pat. No. 4,050,595 granted Sept. 27, 1977 to Bussard discloses a bunk mechanism with no disclosure of adjustment.

U.S. Pat. No. 3,554,394 granted Jan. 12, 1971 to Hedman discloses a trailer mounted assembly having a plurality of longitudinally adjustable support mechanisms to contact the sides of the hull. The support mechanisms are not weight supporting.

U.S. Pat. No. 4,468,150 granted Aug. 28, 1984 to Price discloses a cradle which has limited adjustment capability.

DISCLOSURE OF THE INVENTION

The present invention discloses a boat trailer which is capable of being located in deeper water for launching and recovery of a boat, includes boat supporting bunks adjustable to accommodate a variety of boat hulls, a pair of dolphins or guides which extend above the water when in use to guide the boat to the proper location upon the bunks or support rails as the trailer is pulled from the water, and further includes a latching and securement mechanism permitting the securement and/or release of the craft and the trailer. The securement or release is accomplished with the operator at the helm of the boat and the boat afloat.

With the above noted prior art in mind, it is an object of the present invention to provide a boat trailer which includes as an integral part thereof a latch mechanism for automatic interaction with the bow eye of the boat such that the boat may be powered into the appropriate position for transport on the trailer. The positioning of the boat will activate the latch mechanism, securing the boat in traveling position.

It is another object of the present invention to provide latch mechanism which secures the boat during traveling and storing and yet when it is appropriate for launching, the latch mechanism may be placed in a release position. When the latch mechanism is in the release position, the boat is still secured to the trailer and will remain secured during the launching process. When the trailer is properly positioned, the operator powers the boat forwardly thus releasing the latch and freeing the boat for removal therefrom.

Another object of the present invention is to providem as an integral portion of the boat trailer, a bow guide means assuring the appropriate contact between the bow eye on the boat and the latch mechanism to assure a reliable securement.

Still another object of the present invention is to provide longitudinal bunks upon a boat trailer which are adjustable in both the horizontal and vertical plane such that they may be set to accommodate a plurality of hull designs.

It is still another object of the present invention to provide a boat trailer which has an extendible, telescopic tongue such that the trailer may be placed in deeper water allowing the boat to float free of the trailer or in the alternative, float it to a position vertically above the trailer for recovery.

Still another object of the present invention is to provide an extendible tongue trailer wherein the extendible telescopic portion is under positive control both in the extension and retraction mode.

Still a further object of the present invention is to provide an extendible tongue trailer wherein the materials used to make the trailer functional are largely resistant to corrosion and are self-cleaning.

Yet another object of the present invention is to provide vertical guide elements of a length sufficient to extend above the surface of the water being visible to a boat floating free of the trailer and being capable of guiding the boat to the appropriate position on the trailer and yet quickly and easily storable in a position which will not interfere with travel, and will satisfy highway legal restrictions.

BRIEF DESCRIPTION OF THE DRAWINGS

FIG. 1 is an isometric view of the present invention depicting a trailer incorporating each of the aspects of the present invention.

FIG. 2 is a side elevational view of a boat during the launch or recovery phase.

FIG. 3 is a rear elevational view along lines 3—3 of FIG. 2.

FIG. 4 is a side elevational view of the inventive trailer and boat in the travel condition.

FIG. 5 is a rear elevational view along lines 5—5 of FIG. 4.

FIG. 6 is a plan view of the inventive latch mechanism.

FIG. 7 is a side elevational view of the latch mechanism depicted in FIG. 6.

FIG. 8 is a rear elevational view of the latch mechanism as depicted in FIG. 6.

FIG. 9 is a side elevational view of the telescopic tongue in the contracted condition.

FIG. 10 is a side elevational view of the telescopic tongue in the extended position.

FIG. 11 is a side elevational view partially broken away of the control mechanism for the extendible tongue.

FIG. 12 is a view along lines 11—11 of FIG. 11.

FIG. 13 is an isometric view of the dolphins or guides in the stored or traveling position.

FIG. 14 is a rear elevational view of the dolphin or guide in the operational position.

FIG. 15 is an elevational view showing the adjustment means for the hull support bunk mechanism.

BEST MODE FOR CARRYING OUT THE INVENTION

As seen in FIG. 1, the present invention deals with a boat trailer comprising wheel members 2 mounted to an elongated rectangular frame member 4 having sufficient rigidifying cross members 6 and a forwardly extending V-shaped interconnecting member 8 terminating in an extensible tongue 10 to be described in greater detail hereinafter. The trailer frame is illustrative only and could be one of a variety of configurations and would include appropriate apparatus such as springs, lights, etc. Mounted to the upper portion of the extensible tongue is a bracket and guide means generally depicted as 12 which includes a substantially vertical, horizontally and vertically adjustable upright 14 mounted upon plate 15 and terminating in a rearwardly extending adjustable channel 16 having mounted thereto a rigid V-shaped guide member 18. Hidden by the guide member 18 in this view is an automatic latch mechanism to be described in greater detail hereinafter. Two vertically adjustable bunk members 20 which in combination with keel support member 21 provide lateral stability support for the hull.

Mounted to the rear end of the trailer are a pair of upwardly extending outwardly angled dolphins or guides 22 which urge the boat into the proper lateral position on the bunks as the boat settles onto the trailer. Guides or dolphins 22 are in the position as shown during launch or recovery of the boat but during travel on the highway are pivoted downwardly and telescopically received and secured in containers 24 mounted beneath the trailer frame 4.

As seen in FIGS. 2 and 3, the relative position of the trailer, a boat to be supported thereby, and a towing vehicle can be seen during the launch or recovery phase. As seen in FIGS. 2 and 3, the automobile A is located above the waterline whereas the tongue 10 has been extended so that the boat receiving portion of the trailer is entirely beneath the waterline and the boat B may be floated into position.

Referring now to FIGS. 4 and 5, there is shown the inventive trailer in the travel condition. It can be seen that the dolphins or guides 22 have been moved to their stored position within horizontal laterally disposed containers 24 and the tongue 10 has been shortened such that the trailer closely follows the automobile A.

Referring now to FIGS. 6, 7, and 8 the structure of the automatic latch assembly can be seen. Referring particularly to FIGS. 6 and 8 the main structural element 16 is an inverted channel member forming the upper surface, protecting and containing the latch mechanism itself. Inverted channel member 16 also serves as a rigid support member for the bow stand, V channel or guide member 18 which includes as an integral portion thereof, a buffer plastic element 30 to prevent damage to the hull of the boat during launch or retrieval.

Mounted beneath the upper surface of channel member 16 and within the confines of the channel sidewalls there is a plate member 32 which is longitudinally adjustable by means of bolt 34 mounted within slot 36 in channel member 16.

The forward end of plate 32 is secured to foreshortened channel member 38 whose outer surface is in abutment with securing plate 40. Thus, in summary, plate 32 is adjustable longitudinally of channel member 16 and is held in position vertically by a combination of securement bolt 34 and plate 40 supporting channel member 38. The latch itself designated as 42 is fabricated of generally flat elongated material having a long rear portion 44 located within the channel, is pivotally mounted at 46 and extends outwardly of the bow stand channel 16 to terminate in a latch portion 48 having a roundly tapered outer end followed by a rearwardly opening notch 50, to capture the bow eye 52 mounted upon the boat. It is to be noted that a spacer 54 stands between latch member 42 and the bottom of channel member 38 to hold the latch member in position. The rear end of latch member 42 includes a downwardly extending pin 56 which has secured thereto a tension spring 58 having the outer end secured to a downwardly extending spring bar stud handle 60. Stud handle 60 is rigidly secured to spring bar lever 62 which is pivotally mounted to spring bar pivot bolt 64 enabling the spring bar lever to move from the position shown in solid latching the latch member against the bow eye 52 to the position shown in phantom at which position a removal of the tension between bow eye 52 and latch slot 50 will allow the latch to move to its open phantom position upon pressure relieving, forward movement of boat.

Latch position pall receiver bar 66 is fixed and includes a pall member 68 to interact with spring bar lever 62 to hold the mechanism in the latched position during travel.

In operation, the latch mechanism is set in latching position i.e. that position shown in solid at any time the boat is on the trailer for travel or at the time the boat is to be recovered. With the latch in this position, the boat is moved forwardly to a position above the trailer and the bow contacts the bow stand V channel guides which slightly lift the bow of the boat so that the bow eye is in proper alignment with the latch. Further forward movement causes the bow eye to contact the outer portion of the latch moving it to the side until the bow eye clears at which point the spring causes it to return and hold the bow eye in position. For launching the boat, the spring bar lever is moved from the solid position to the phantom position which places the latch under spring tension in the reverse direction. The location of the boat maintains the latch mechanism until the boat is in the water. Once the boat is launched, the operator powers the boat forward releasing the tension on the bow eye causing the latch to release and the boat is free to move away from the trailer.

Reference is now had to FIG. 9 wherein the tongue of the boat is shown in its retracted position, the side rail 8 being foreshortened for clarity. The tongue itself includes an exterior box beam 10 welded to side rails 8 and extending rearwardly therefrom. Telescopically received within 10 is a smaller dimensioned box member 70 which in FIG. 9 is shown extending rearwardly from 10 and includes a pulley 72 at its rearwardmost end and a winch 74 and trailer hitch 76 at its forwardmost end. Mounted to the upper surface of box member 10 is a fixed element 78 to which is secured a cable 80. At the opposite end of box beam member 10 is a fixed element 82 to which is secured a roller chain member 84 which engages with a sprocket member on winch 74 before it interconnects with cable 80 in the interior of box member 70. As seen in FIG. 10, the same elements are shown and the same numerals are used for identification, however, the tongue is shown in its extended position thus removed forwardly of box beam member 10.

The mechanism which allows the tongue to be under positive control both in the expansion and retraction modes is shown in FIG. 11 wherein the box beam members have been foreshortened for clarity. As seen in this view, the chain 84 which is adjustably secured to upright 82 mounted to box beam 10 engagedly wraps around drive sprocket 75 which is an integral part of winch 74, proceeds downwardly and engages idler sprocket 86 interior of box beam 70, is interconnected with cable 80 which passes over sheave 72 to dead end in a tension adjustable connection with upright 78 again secured to element 10. Movement of the winch by conventional means causes the sprocket to turn, moving the element 70 longitudinally and colinearly with box beam 10. The movement of element 70 relative to element 10 is facilitated by utilization of synthetic bearings 88. Bearings 88 which as best seen in FIG. 11 are located at each end of box beam 10 and comprise disc type configurations of the bearing itself which are secured to element 10 by a centrally located fastening means allowing the bearings to assume the position of least resistance to movement of box beam 70 thereby and also provides a self-cleaning action thereof.

It is to be understood that the movements described hereinabove are relative to each other. In operation, since the tongue is fixed to the auto, 10 would move relative to 70.

A pin or other securement will be used for safety locking the device in either position.

Thus as can be seen, the simple straightforward mechanism which requires little or no maintenance and is easily adjustable to accommodate differences caused by weather conditions permits the extendible tongue element denoted as 70 to move from a position whereat the trailer hitch 76 is substantially adjacent the front end and interconnection with elements 10 and 8 to a position whereat the front end of the trailer is substantially removed from the trailer hitch allowing the trailer to be placed in far deeper water.

Another aspect of the present trailer which makes the concept operable includes the upwardly extending guides or dolphins 22 which as seen in FIG. 12, are shown in their stored position within containers 24. As seen in this view, the end of container 24 opposite of the utility position of dolphin 22 is open (for drainage). The dolphin is secured to the trailer by means of a channel member 90 which is pivotably secured to container 24 by bolts at each end of 24 is secured by three vertical bolts at each end of 24 (not shown) through lower channel bracket and chassis rails, permitting lateral adjustment. Channel member 90 is welded to sleeve member 94 which telescopically receives the dolphin 22. In use, the dolphin member 22 is pulled outwardly of container 24, pivoted upwardly about element 92 and secured in position by interaction with bore 96 in the bottom surface of container 24. The dolphin itself comprises an interior metal pipe 98 secured to an exterior plastic pipe 100. As can be seen in FIG. 13, the metal pipe 98 extends downwardly somewhat from the plastic pipe 100, the two being secured together by fastener means 102 such that the dolphin is rigidly held in position from horizontal movement by the interaction of the bore 96 with the pipe 98 and vertically by the interaction of the plastic pipe 100 adjacent the bottom of container 24.

As was pointed out hereinabove, the inventive trailer as one of its unique features a plurality of adjustable bunks or supports to accommodate a variety of hulls. The bunk member 20 is pivotally secured by element 104 to the upper end of threaded member 106 which is threadingly received in nut 108 resting on rigid pipe member 110 which is in turn secured by a friction fit with eye bolt 112 to cross-frame member 4.

In summary then, it can be seen that the present invention provides a trailer which eliminates the inconveniences and the potential harm and danger present in currently available trailers while still providing a relatively simple mechanism which permits a boat to be more easily launched or retrieved in rough water and with the involvement of fewer people.

I claim:

1. A boat trailer adapted to simplify the launching and loading of a boat comprising:
    a main frame member including infinitely adjustable bunk means to support the boat;
    extendible tongue means to allow the trailer to be further from the vehicle during launching and loading;
    latch means whereby the boat may be powered into position over the submerged trailer and then automatically securely latched in place, and further the trailer may be backed into the water with the latch secured, and the boat powered forwardly causing the latch to release, freeing the boat;
    dolphins movable from a stored position beneath the trailer for travel to an operative position to guide the boat onto the trailer, said dolphins angled upwardly and outwardly with respect to the trailer frame, said dolphins being of a sufficient length to extend above the waterline when the trailer is deep enough for the boat to float free.

2. A support system for use upon a boat trailer comprising:
    a trailer frame including wheels and a hitch;
    continuous keel support means extending longitudinally along the center of the frame;
    a pair of continuous side support members along the opposite sides of the frame, said side support members infinitely adjustable vertically and horizontally to accommodate a variety of hulls.

3. A support system as in claim 2, wherein the adjustment to the side support members may be made from the exterior of the trailer while under load without requiring additional load support mechanisms.

4. A support system as in claim 2, wherein the support members are rigid but flexible enough to accommodate contours of the boat.

5. Self-storing guide members for assisting in launching and recovering a boat from a trailer or the like including a frame comprising:
    a pair of substantially horizontal elongated storage elements secured to the frame laterally thereof,
    a pair of bracket means, pivotable about a horizontal axis, one of each of said pair of bracket means secured to the outer opposite end of one of each pair of said storage elements;
    a pair of rigid guide members telescopically mounted, one in each of the bracket means, said guide members movable from a stored position within the storage elements to an operational position extending upwardly and outwardly from the frame.

6. Securement means as in claim 5, wherein said latch mechanism when in the first position may be unsecured and a positive movement relieving the pressure on the latch mechanism allows it to move to the second unlatched position.

7. Securement means as in claim 5, wherein the latch mechanism is compatible with standard bow eyes.

8. Securement means for a boat trailer comprising:
    upwardly extending, rigid bow post means mounted to the front of the trailer, said bow post means including rewardly and downwardly extending guide means to lift the bow of the boat to be secured at the latching position,
    latch means, operable at various angles of attack, including a latch element selectively movable from a first latched position to a second unlatched position,
    resilient means selectively urging the latch means to its first or second position whereby a boat may be latched or unlatched solely by contact between the bow eye of the boat and the latch means.

* * * * *